United States Patent
Hiratsuka et al.

(10) Patent No.: US 7,849,873 B2
(45) Date of Patent: Dec. 14, 2010

(54) HEATER UNIT FOR INSTALLATION ON VALVE

(75) Inventors: Akihiko Hiratsuka, Komae (JP); Tsuguhiro Nomoto, Komae (JP)

(73) Assignee: Tokyo Technological Labo Co., Ltd. (JP)

( * ) Notice: Subject to any disclaimer, the term of this patent is extended or adjusted under 35 U.S.C. 154(b) by 518 days.

(21) Appl. No.: 10/553,959

(22) PCT Filed: Apr. 19, 2004

(86) PCT No.: PCT/JP2004/005567

§ 371 (c)(1), (2), (4) Date: Oct. 19, 2005

(87) PCT Pub. No.: WO2004/094883

PCT Pub. Date: Nov. 4, 2004

(65) Prior Publication Data

US 2006/0225788 A1    Oct. 12, 2006

(30) Foreign Application Priority Data

Apr. 21, 2003    (JP)    ............................. 2003-115203

(51) Int. Cl.
  *H05B 1/00*    (2006.01)
(52) U.S. Cl. ................................................. 137/341
(58) Field of Classification Search ............ 137/341, 137/884

See application file for complete search history.

(56) References Cited

U.S. PATENT DOCUMENTS

| | | | |
|---|---|---|---|
| 5,485,542 A | 1/1996 | Ericson | |
| 5,614,119 A | 3/1997 | Ollis | |
| 6,060,691 A | 5/2000 | Minami et al. | |
| 6,478,043 B2 | 11/2002 | Ishigaki | |
| 2003/0005959 A1 * | 1/2003 | Yamaji et al. | ............... 137/341 |

FOREIGN PATENT DOCUMENTS

| | | |
|---|---|---|
| JP | 56113879 | 9/1981 |
| JP | 4064788 | 2/1992 |
| JP | 7035256 | 2/1995 |
| JP | 7071648 | 3/1995 |
| JP | 2001-099382 | 4/2001 |

OTHER PUBLICATIONS

International Search Report dated Aug. 17, 2004 Application No. PCT/JP2004/005567.

* cited by examiner

*Primary Examiner*—John Fox
(74) *Attorney, Agent, or Firm*—Studebaker & Brackett PC; Donald R. Studebaker

(57) ABSTRACT

A heater unit having a main body constructed in the form of a housing and covers the entire flow path forming sections of the valve and joints, and a heater built in the main body is mounted on the valve. The heater includes a direct heating section and a radiant heating section. The direct heating section heats at least a part of the flow path forming sections of the valve through direct contact heating. The radiant heating section heats the inside of the main body of the heater unit by radiant heat.

3 Claims, 4 Drawing Sheets

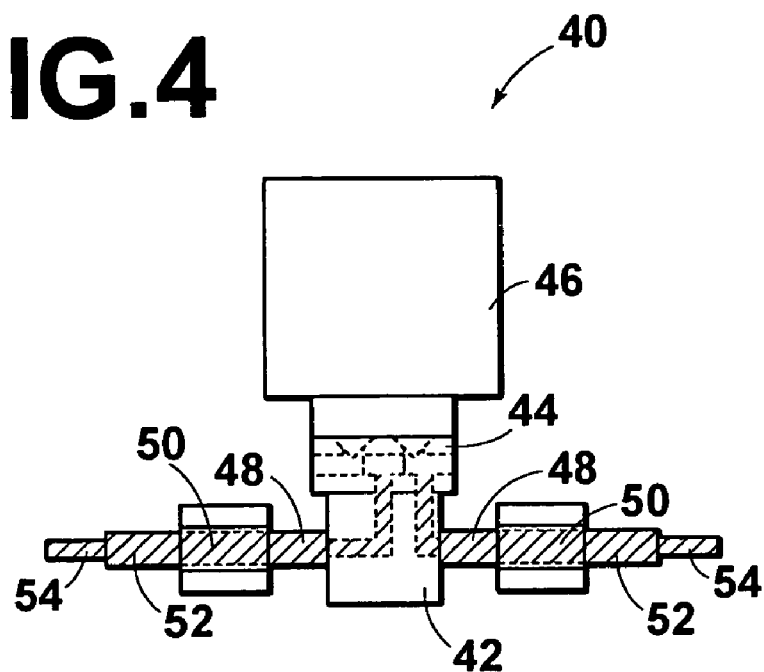
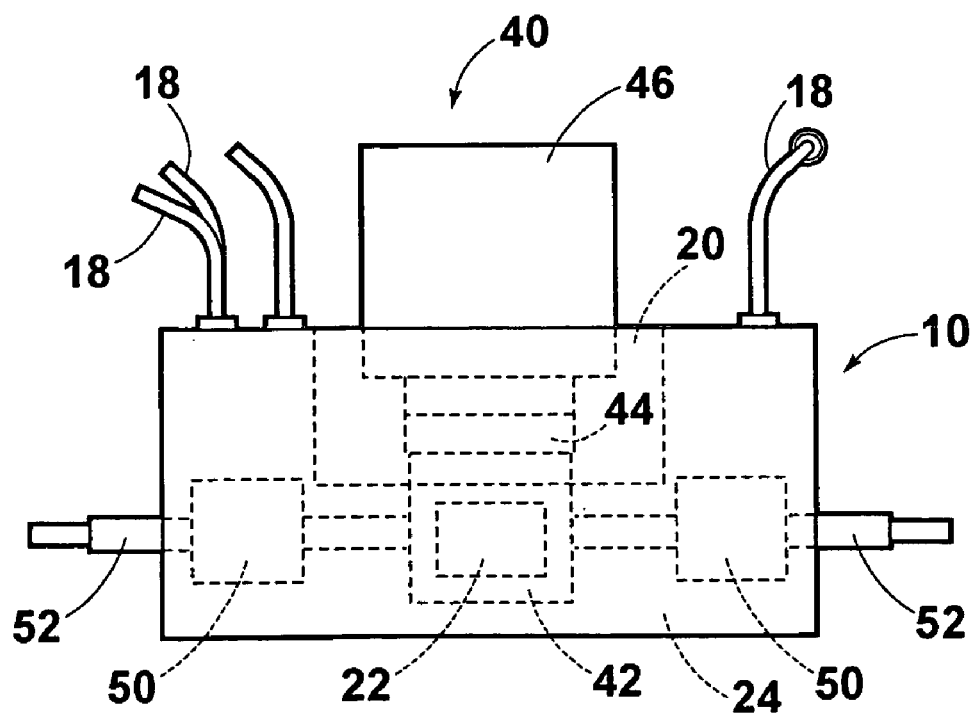

HEATER UNIT FOR INSTALLATION ON VALVE

TECHNICAL FIELD

The present invention relates to a valve mount heater unit to be mounted on a valve connected to a fluid piping system through joints.

BACKGROUND ART

For a valve mounted on a piping system that supplies gas to semiconductor manufacturing equipment or the like, it is necessary to prevent formation of dew condensation within the valve due to a temperature drop in the gas as it passes through the valve. In addition, a valve mounted on a piping system that carries liquid that solidifies at a temperature near room temperature, it is necessary to prevent a blockage of the valve or development of accretion within the valve due to solidification of the liquid. Still further, for a piping system that carries high temperature gas or liquid, a temperature drop in the fluid to be carried through the piping system as the fluid passes through the valve is a problem when the fluid needs to be carried through the piping system without any appreciable temperature drop.

In order to prevent these problems, different types of heating mechanisms, which are built in or attached to a fluid valve, for heating the area within the valve where the fluid passes and the like have been proposed as described, for example, in Japanese Unexamined Patent Publication No. 7 (1995)-71648, Japanese Unexamined Patent Publication No. 2001-349486, and PCT Japanese Publication No. 10(1998)-502995.

The problem of dew condensation, development of accretion and the like, however, may occur not only in the valve section but also in the joint sections connecting the valve to a piping system. The conventional valve heating mechanisms, however, are either built in the valve or mounted only on the valve. Consequently, heretofore, additional heaters have been required for mounting on the join sections.

The situation in which separate heating mechanisms are required for the valve and joint sections creates a problem of unequal heating between the flow paths within the valve and joints, as well as problems of increased cost and complicated configuration of the piping system.

In view of the circumstances described above, it is an object of the present invention to provide a heating mechanism capable of heating not only a valve connected to a fluid piping system through joints but also the joints integrally and uniformly.

DISCLOSURE OF INVENTION

The valve mount heater unit of the present invention is a valve mount heater unit to be mounted on a valve connected to a fluid piping system through joints, the unit comprising:

a main body constructed in the form of a housing having pipe through-holes and an actuator exposing opening, and covers flow path forming sections of the valve and joints; and a heater built in the main body, wherein the heater comprises:

a direct heating section for heating at least a part of the flow path forming sections of the valve through direct contact heating; and a radiant heating section for heating the inside of the main body by radiant heat.

Here, in the valve mount heater unit described above, the valve may be a two-way valve, which is placed between a pair of pipes disposed linearly, and connected to the pipes through a pair of joints; the main body may comprise a pair of housing halves which are fitted together with the valve connected to the pair of pipes being sandwiched therebetween from both sides of the pair of pipes; the pipe through-holes and the actuator exposing opening may be formed by fitting together a plurality of cutouts provided on the edges of each of the housing halves; the heater may comprise flat panel heaters, each installed inside of each of the pair of housing halves such that the flat panel heaters face with each other across the valve when the pair of housing halves is fitted together; and the direct heating section and radiant heating section may be provided on each of the opposing surfaces of the flat panel heaters. Here, it is preferable that the direct heating section is provided on each of the opposing surfaces of the flat panel heaters at the same position as the actuator exposing opening in the longitudinal direction of the pair of the pipes, and the radiant heating section is provided around the direct heating section.

The valve mount heater unit of the present invention comprises the main body constructed in the form of a housing and covers the flow path forming sections of the valve and joints, and the entire region covered by the main body is heated by the combination of the direct and radiant heating. This allows the entire flow path included in the flow path forming sections of the valve and joints to be heated integrally and uniformly. Further, separate heaters for mounting on the valve and joints are not required, resulting in cost reduction and simplified piping structure.

Further, the valve mount heater unit of the present invention comprises the direct heating sections for heating at least a part of the flow path forming sections of the valve by direct contact heating. If the direct heating sections are arranged such that they contact the region of the flow path forming sections where the temperature is likely to drop significantly, the effect of the uniform heating may be further enhanced. For example, by disposing the direct heating sections adjacent to the actuator exposing opening provided on the main body of the heater unit, and heating through the direct contact heating the area which is likely to be more influenced by the heat loss through the exposed portion of the actuator, the heat loss may be compensated for and uniform heating may be realized.

Still further, in the valve mount heater unit of the present invention, the area of the flow path forming sections of the valve and joints covered by the main body other than that which is brought into direct contact with the direct heating sections is heated by the radiant heat. This allows certain flow path forming sections which are, for example, difficult to bring into direct contact with the direct heating sections due to their configurations, or direct contact of the sections with the direct contact heating sections may interfere valve operation due to frictions or the like, joints having a hexagonal nut-shape, and the like may be heated effectively and uniformly by the radiant heat radiated from the radiant heating sections.

BRIEF DESCRIPTION OF DRAWINGS

FIG. 4 is a front view of the valve shown in FIG. 3.

FIG. 5 is a front view of the valve shown in FIG. 3 with the heater unit shown in FIG. 1 being mounted thereon.

BEST MODE FOR CARRYING OUT THE INVENTION

Figure 1:
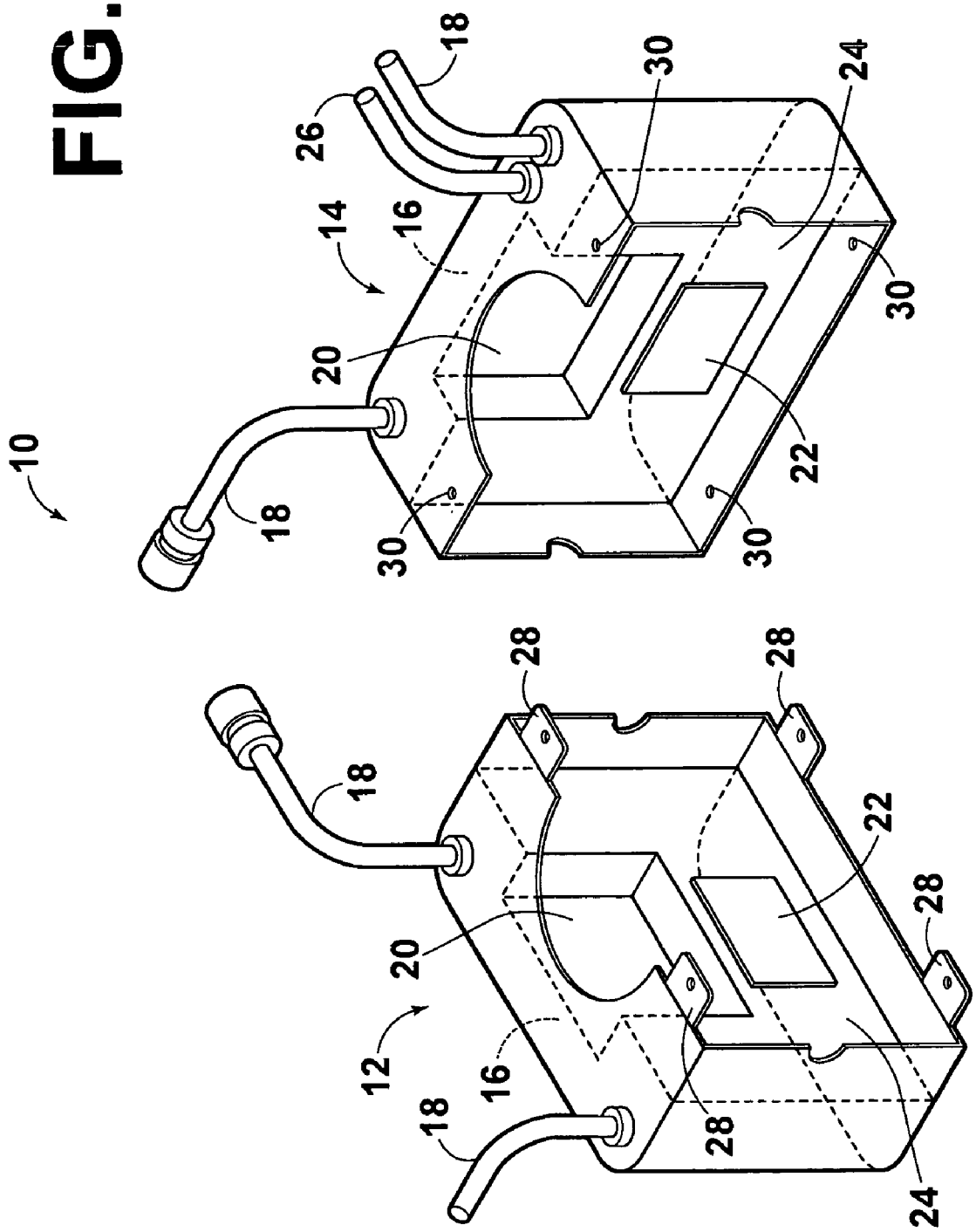
FIG. 1 is a perspective view of a heater unit having a main body that includes a pair of housing halves according to an embodiment of the present invention, illustrating the heater unit being opened.

Hereinafter an illustrative embodiment of the present invention will be described in detail with reference to the accompanying drawings. In each of the drawings, identical components are given the same reference numerals.

FIG. 1 is a perspective view of a heater unit 10 according to an embodiment of the present invention illustrating the main body of the unit comprising a pair of housing halves 12, 14 being opened. Each of the pair of housing halves has a built-in ceramic heater 16 along the side wall. Each of the ceramic heaters 16 generates heat when a current is flowed through a lead wire 18 whose both ends are drawn outside. A stainless panel is attached to the inner surface of the ceramic heater 16, forming a flat panel heater. The flat panel heater has a recessed portion 20 at the top to receive the lower portion of the actuator of a valve to be described later. A heat insulating material (not shown) is inserted between the ceramic heater 16 and outer wall of each of the housing halves 12, 14 in order to prevent heat loss arising from the outer wall of the main body becoming hot. Another stainless plate is provided on the surface of the stainless panel attached to the inner surface of the ceramic heater 16 below the recessed portion 20, forming a direct heating section 22. The area other than that where the direct heating section 22 is provided on the surface of the stainless panel attached to the inner surface of the ceramic heater 16 forms a radiant heating section 24. A wire indicated by the reference numeral 26 is the wire of a thermocouple that monitors the temperature of the ceramic heaters 16. The housing half 12 has four brackets 28, each with a screw hole, and the housing half 14 has four screw holes in order to fit the housing halves together.

Figure 2:
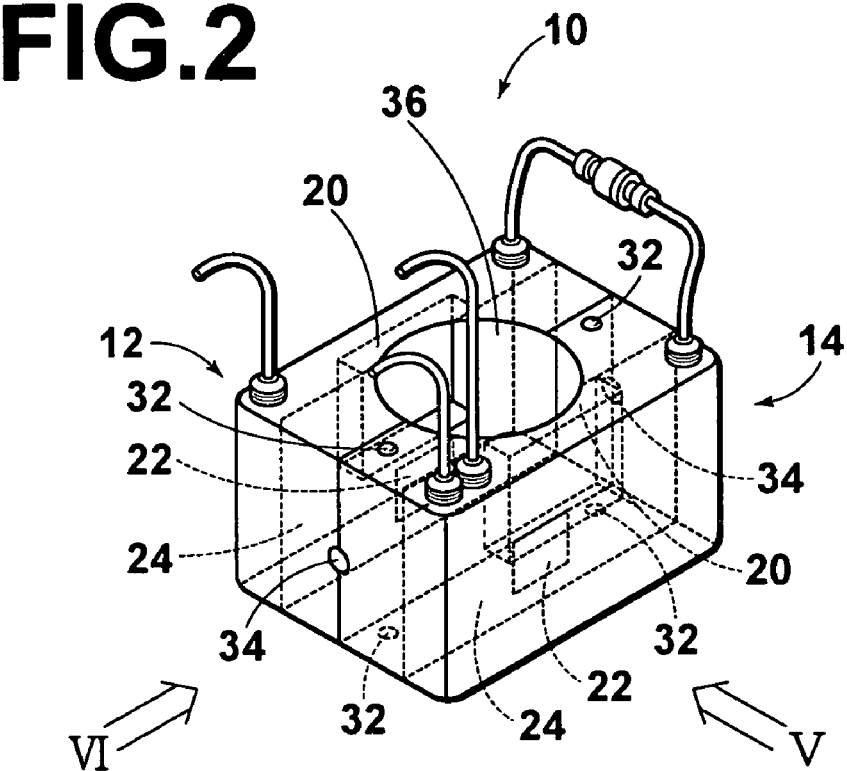
FIG. 2 is a perspective view of the heater unit shown in FIG. 1, illustrating the heater unit being closed.

FIG. 2 is a perspective view of the heater unit 10 shown in FIG. 1, illustrating the housing halves 12, 14 being closed by fitting each screw hole of each of the brackets 28 and each of the corresponding screw holes 30 together, and fixing them with a fixing screw 32. When the heater unit 10 is closed in the manner as described above, two pipe through-holes 34 are formed on the opposite sides, and an actuator exposing opening 36 is formed on the top surface. The actuator exposing opening 36 is formed at the place corresponding to the recessed portions 20 for receiving the lower portion of the actuator. When the heater unit 10 is in the closed state, the direct heating sections 22, and the radiant heating sections 24 in the respective housing halves 12, 14 are facing with each other in parallel and symmetrically.

Figure 3:
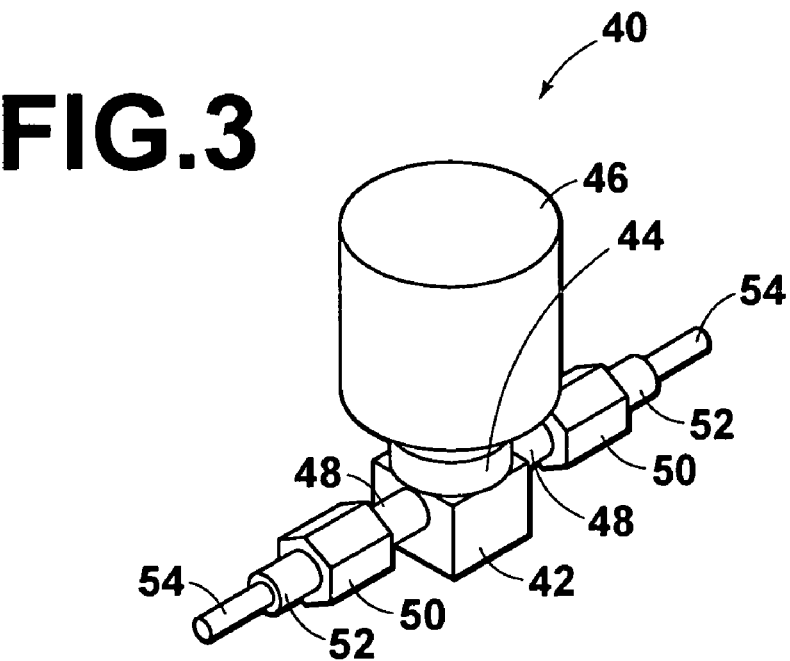
FIG. 3 is a perspective view of an illustrative valve connected to a fluid piping system through joints.

FIGS. 3 and 4 respectively show an illustrative valve connected to a fluid piping system. FIG. 3 is a perspective view thereof, and FIG. 4 is a front view thereof. The entire valve is indicated by the reference numeral 40, which is constituted by a body 42, a diaphragm case 44 having a diaphragm mechanism therein, an actuator 46, and a pair of connecting sections 48. Each of the connecting sections 48 is connected to a piping system 54 through a hexagonal nut-shaped joint 50 and a sleeve 52. The hatched portion in FIG. 4 indicates the flow path. When the valve 40 is opened, a fluid flows from one of the connecting sections 48 to the opposite connecting section 48 through the body 42, the diaphragm case 44, again through the body 42. Thus, these sections are referred to as the flow path forming sections of the valve.

Figure 6:
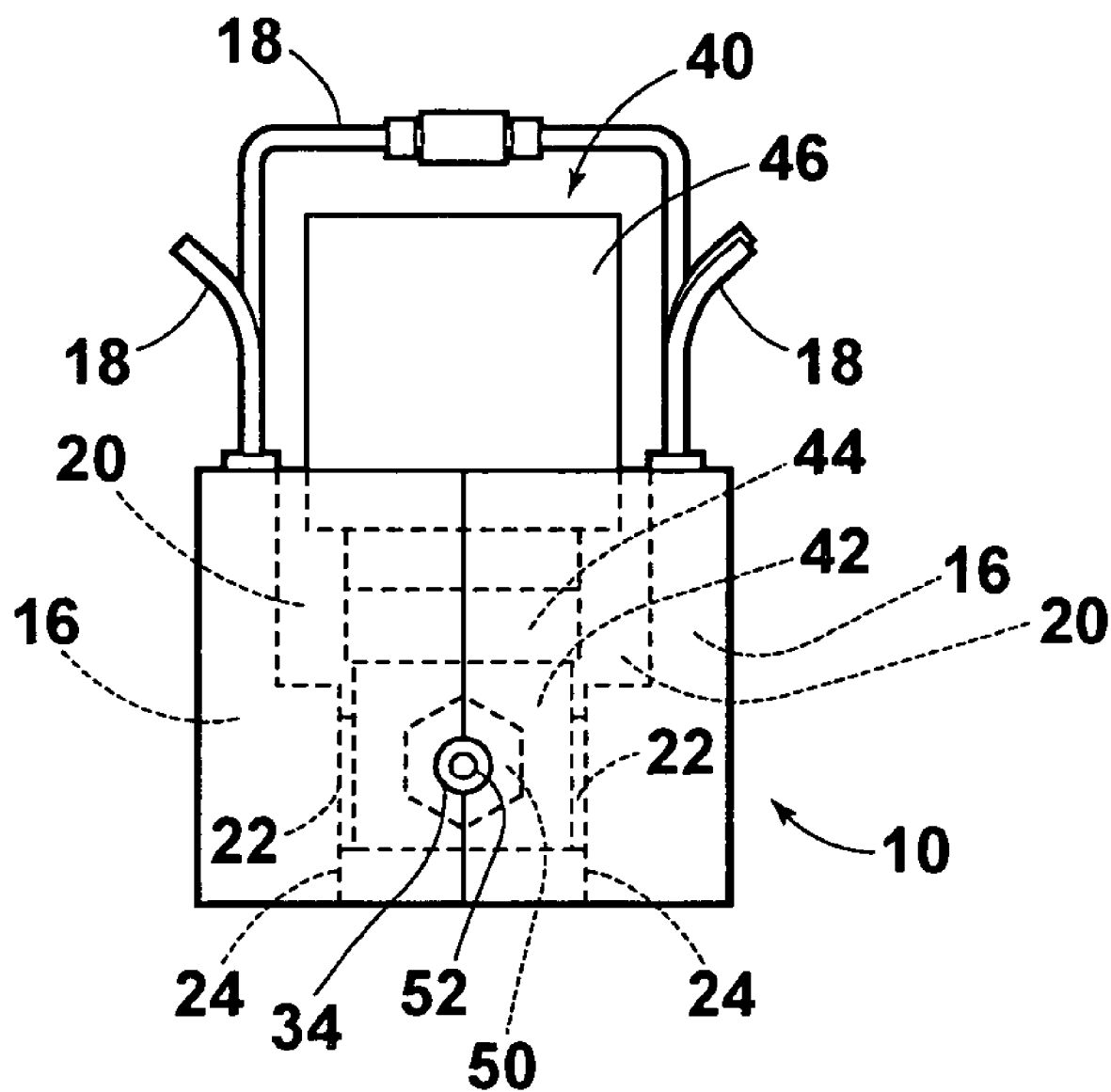
FIG. 6 is a side view of the valve shown in FIG. 3 with the heater unit shown in FIG. 1 being mounted thereon.

FIGS. 5 and 6 respectively show the valve 40 shown in FIG. 3 with the heater unit 10 being mounted thereon. FIG. 5 is a front view thereof viewed from the direction indicated by the arrow V in FIG. 2. FIG. 6 is a side view thereof when viewed from the direction indicated by the arrow VI in FIG. 2. As shown in the drawings, the main body of the heater unit 10 comprising a pair of housing halves 12, 14 covers from the lower portion of the actuator 46, through diaphragm case 44 disposed therebelow, to the entire body 42 of the valve 40 in the vertical direction. The upper portion of the actuator 46 protrudes from the actuator exposing opening 36. The lower portion of the actuator 46 and diaphragm case 44 are accommodated in the recessed portions 20. In the mean time, as for the horizontal direction, the main body of the heater unit 10 covers from a part of one of the sleeves 52 to a part of the other sleeve 52. Here, each of the pipe through-holes 34 has a diameter that fits with each of the sleeves 52. By the configuration described above, the pair of joints 50 and entire flow path forming sections of the valve 40 are covered by the main body of the heater unit 10. In addition, the pair of direct heating sections 22 within the heater unit 10 comes in direct contact with the body 42 from both sides of the valve 40.

The operation of the heater unit 10 will be described herein below when the heater unit 10 is mounted on the valve 40 as shown in FIGS. 5 and 6, and the ceramic heaters 16 are activated by flowing a current through the lead wire 18.

When the ceramic heaters 16 are activated, both the direct heating sections 22 and radiant heating sections 24 are heated. The body 42 of the valve 40 is heated by the direct heating sections 22 through direct contact heating. The reason for heating the body 42 through the heat effective direct contact heating is that the body 42 is disposed under the actuator 46 whose upper portion above the actuator exposing opening 36 is exposed, and the temperature of the body 42 is likely to drop due to the heat radiation from the actuator 46. In the mean time, other sections included in the main body of the heater unit 10 are heated by the radiant heat radiated from the radiant heating sections 24 and contained within the main body of the heater unit 10. Here, the wall of each of the recessed portions 20 is also made of a stainless plate, forming a part of the radiant heating section 24. This allows the diaphragm case 44 and the like accommodated in the recessed portions 20 to be heated effectively. Through the operation of the heater unit 10 in the manner as described above, the pair of joints 50 and the entire flow path within the valve 40 are heated integrally and uniformly. In this way, formation of dew condensation and development of accretion are prevented in the entire flow path.

The heater unit 10 of the present embodiment is designed for a two-way valve. Various modifications and variations will be readily apparent to those skilled in the art by referencing the description above, including adaptation for a three-way valve application and the like.

The embodiment of the present invention has been described in detail. It should be understood that the description of the embodiment is illustrative of the present invention. Accordingly, the technical scope of the present invention should be defined only by the appended claims.

What is claimed is:

1. A heater unit to be mounted on a valve having flow path forming sections including a valve body connected to a fluid piping system through joints, and having an actuator connected to the valve body, the valve being a two-way valve, in which the valve body is placed between a pair of pipes, and connected to the pipes through a pair of joints and sleeves, the unit comprising:

a main body constructed in the form of a housing having pipe through-holes and an actuator exposing opening; and a heater unit in the main body, wherein the heater unit comprises:
 a direct heating section configured to heat the body of the valve through direct contact heating; and
a radiant heating section, surrounding the direct heating section, and extending to an area of the flow path forming sections, excluding an area which is brought into direct contact with the direct heating sections, the pair of joints and a part of each of the sleeves, enclosed by the main body, configured to heat the inside of the main body by radiant heat;
wherein each of the pipe through-holes has a diameter for receiving each of the sleeves, and
the flow path forming sections including the body, the whole of the pair of the joints, and the part of the sleeves are entirely covered by the main body so that only the residual areas of the sleeves and the fluid piping system is exposed from the pipe through-holes, and the area extending from the part of one sleeve to the part of the other sleeve excluding the area which is brought into direct contact with the direct heating sections, enclosed by the main body, are constructed so as to be heated by the radiant heat from the radiant heating section.

2. The heater unit according to claim 1, wherein
the main body comprises a pair of housing halves which are fitted together with the body and the pair of pipes being sandwiched therebetween from both sides of the pair of pipes;
the pipe through-holes and the actuator exposing opening are formed by fitting together a plurality of cutouts provided on the edges of each of the housing halves;
the heater comprises flat panel heaters, each installed inside of each of the pair of housing halves such that the flat panel heaters face with each other across the valve when the pair of housing halves is fitted together; and
the direct heating section and radiant heating section are provided on each of the opposing surfaces of the flat panel heaters.

3. The heater unit according to claim 2, wherein the direct heating section is provided on each of the opposing surfaces of the flat panel heaters at the same position as the actuator exposing opening in the longitudinal direction of the pair of pipes.

\* \* \* \* \*